Nov. 24, 1959    H. NAFTULIN ET AL    2,914,181
PLASTIC TUBE CONNECTIONS
Filed May 10, 1957
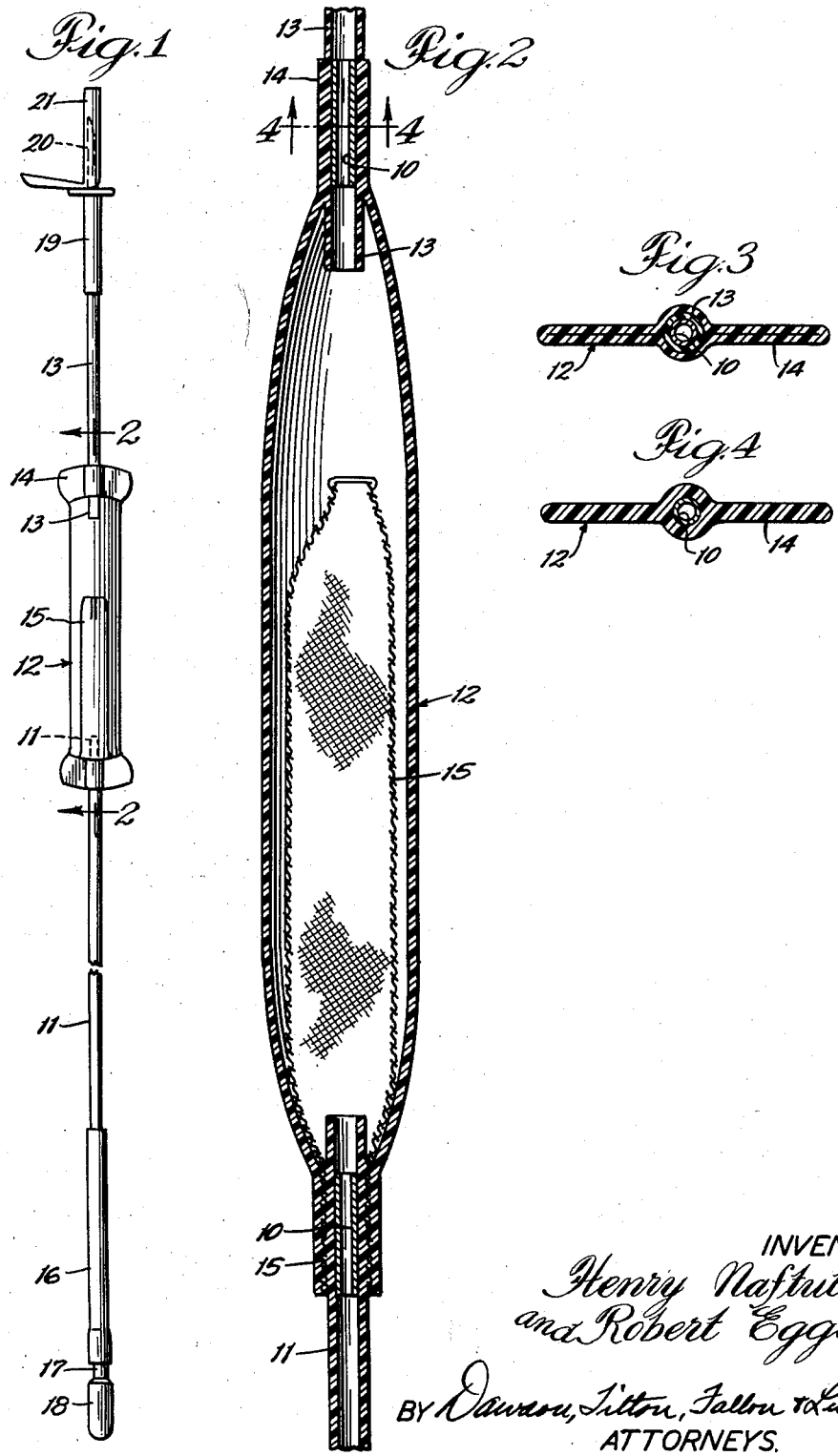
INVENTORS:
Henry Naftulin
and Robert Egge,
BY Dawson, Tilton, Fallon & Lungmus,
ATTORNEYS.

United States Patent Office 2,914,181
Patented Nov. 24, 1959

2,914,181

PLASTIC TUBE CONNECTIONS

Henry Naftulin, Skokie, and Robert Egge, Midlothian, Ill., assignors to Michael Reese Research Foundation, Inc., Chicago, Ill., a corporation of Illinois Application May 10, 1957, Serial No. 658,429

6 Claims. (Cl. 210—446)

This invention relates to plastic tube connections and method of forming. The invention is particularly useful in the uniting of plastic tubes with enlarged tubes such as filter tubes, drip tubes, and the like.

An object of the present invention is to provide a connected tube structure in which a thermoplastic tube is connected to another thermoplastic tube in a single operation and wherein the connected tubes are reinforced at their point of fusion. A further object is to provide a method and means for welding thermoplastic tubes through the use of an internal electrode serving as a mandrel. A still further object is to provide a method and means for uniting lengths of tubing which may be fused together by means which bring about such union independently of the lengths of the tubes. Yet another object is to unite thermoplastic tubes providing four or more thicknesses, the union or fusing being accomplished in a single operation. Still another object is to provide a method and means for uniting tubes with enlarged transparent tubes such as drip tubes, filter tubes, etc., whereby an integrated tube structure is effected in a single operation at each end of the enlarged tube.

While under present practice it is necessary to insert a short plastic tube in at least one end of the large tube and then attach the elongated tube to the short tube, we have discovered that the short connecting tube can be entirely eliminated and small tubes can be united to the large tube irrespective of the length of such first-mentioned tubes. Other specific objects and advantages will appear as the specification proceeds.

The invention is shown, in an illustrative embodiment, by the accompanying drawing, in which—

Figure 1 is a broken top plan view of a filter tube with connecting tubes united to the filter tube in accordance with our invention; Fig. 2, an enlarged sectional view, the section being taken, as indicated, at line 2—2 of Fig. 1; Fig. 3, a transverse sectional view at the point of union of the tubes but before the final fusing thereof; and Fig. 4, a sectional view similar to Fig. 3 taken, as indicated, at line 4—4 of Fig. 2 and showing the plastic parts in final, fused condition.

In one embodiment of our invention, we place a metal tube within a tube 11 and insert this tube, equipped with the metal tube 10, into a thermoplastic tube 12. There is thus provided an overlapping plastic tube portion of four thicknesses in cross section, as illustrated best at the bottom portion of Fig. 2 and as illustrated also in Fig. 3. In this structure, the metal tube serves as an intermediate electrode and as a mandrel or support during the pressure operation required for fusion after a period of preheating the material.

The overlapping thermoplastic portions are then fused by the usual dielectric heating process in which a current is passed through the dielectric material to bring about the effective fusion shown at the top of Fig. 2 and as illustrated in Fig. 4. While the current can be passed through short spaces to bridge the air gap, it is found that effective fusion is not brought about where there is an extensive separation between plastic layers, as where one tube is welded within another tube, and an intermediate internal electrode is necessary to bring about the current flow through the material to fuse the same. By inserting a short length of metal tube to provide a conductor or electrode, it is found that complete fusion of the plastic layers can be effected while at the same time the tube serves as a support during the application of pressure which is required for fusion after a period of preheating the material.

The final fusion operation is shown best at the top of Fig. 2 and Fig. 1, the inner small tube 13 being completely fused with the overlapping portion of tube 12, as indicated at 14.

The internal electrode 10 is not heated in the operation described. The tube 10 is a conductor for the radio frequency waves in the welding operation, so that they can bridge the gap across the internal diameter of the tubing without such loss of power as might impair or prevent the weld occurring at that point.

As a result of the foregoing operations performed at each end of the tube 12, there is provided a flattened web 14 at each end and there is a projecting inner portion of the tube 13 and the tube 11. A filter 15, which may also be formed of plastic, has its lower open end preferably sealed within the fused portion of the structure. It will be understood that the tube 12 may be employed with or without a filter 15, and may be used as a sight tube, drip tube, or for any other desired purpose. We prefer to employ transparent plastic material such as polyethylene, vinyl plastics, ethylene terephthalate, etc. Any thermoplastic material may be employed for the two or more tubes which are to be connected. Since the effective connection is accomplished through the use of the small lengths of metal tubing, the tubes may be of any length and the fusion is accomplished readily in situ by the well known process of dielectric heating, etc.

The metal tubes 10 may be formed of aluminum, stainless steel, or any other conductor effective for serving as a mandrel while also providing an intermediate electrode for the heat-welding operation. We have found that aluminum tubes are particularly effective because of the rapid transfer of heat and the quick resulting fusion brought about in the welding operation.

The union of tubes of any desired length with the enlarged tubing 12, or with tubes of any size, is brought about in a modicum of time by simply inserting the tubes 10 in a position where the weld is to occur, inserting them within the main tube to which they are to be connected, and then welding together the overlapping portions by dielectric heating and the application of the necessary pressure for bringing about fusion of the plastic layers.

By employing the internal mandrel electrode 10, fusion of the six thicknesses shown at the bottom of Fig. 2, including the double thickness of tube 12, the double thickness of tube 11, and the double thickness of the nylon filter tube 15, is accomplished in a single operation.

It will be understood that the tubes 11 and 13 shown connected to the tube 12 are merely illustrative in character and may be employed with other well known equipment. In the illustration given in Fig. 2, the tube 11 is connected to a rubber tube 16 at its outer end, which in turn carries a needle adapter 17 provided with a resilient sealing cap 18. The tube 13 is similarly connected at its outer end to a rubber tube 19 carrying a cannula 20 encased by a sterile protective sleeve 21.

The specific structure shown may be employed for the dispensing of blood, blood plasma, or other blood portions or solutions from a container by inserting the cannula or needle 20 into an opening within the filled container. The liquid passing into the filter tube 12 is filtered and is dispensed through the tube 11 in a well known manner.

Instead of having a single tube such as tube 11 extend into the large tube 12, it will be understood that a number of tubes, each equipped with a metal mandrel tube, may be inserted into an open end of the tube 12 and the various tubes may be simultaneously secured in position so as to place each of the connected tubes in open communication with the interior of the tube 12.

In the foregoing operation, the short metal tube remains within the connected plastic tubes as a permanent reinforcing structure, while in the assembly or fusion operation, it serves the important purpose of an intermediate electrode for the carrying of electric current through the tubing to preheat the plastic members, enabling fusion then to be accomplished upon the application of heat, as in the usual fusion operations.

While, in the foregoing specification, we have set out specific structures and steps in considerable detail for the purpose of illustrating the invention, it will be understood that such details of structure and procedure may be varied widely by those skilled in the art without departing from the spirit of our invention.

We claim:

1. In combination, a first thermoplastic tube having at least one open end portion, a second thermoplastic tube having an end portion extending into said open end portion in overlapping relation therewith, and a metal tube within said second tube portion extending into said first tube, said overlapping portions of said first and second thermoplastic tubes being fused together about said metal tube.

2. In combination, an enlarged first thermoplastic tube having an open end portion, a second thermoplastic tube of smaller diameter having an end portion extending into and overlapped by the open end portion of said first tube, and a metal tube within said second tube portion extending into said first tube, said overlapping portions of said first and second plastic tubes being fused together about said metal tube.

3. The structure of claim 2, in which the fused tube portions form a flattened flange extending about and reinforcing the fused second tube portion.

4. In combination with a first thermoplastic filter tube having a plastic filter therein and having an open end portion, said plastic filter having a neck portion disposed within the open end portion of said filter tube, a second thermoplastic tube having an end portion extending within the open end portion of said filter tube and within the neck portion of said filter, a metal tube within said second tube portion extending into said first tube, the overlapping plastic tube and filter portions all being fused together about said metal tube.

5. The structure of claim 1, in which said metal tube is formed of aluminum.

6. In combination, an enlarged thermoplastic tube having at least one open end portion, a second thermoplastic tube of smaller diameter than said enlarged tube and having an end portion extending through the open end portion of said enlarged tube, and a metal tube tightly disposed within the interior of the end portion of said second tube, said enlarged tube and said second tube having their end portions fused together to form an integral tubular plastic wall about the periphery of said metal tube.

References Cited in the file of this patent

UNITED STATES PATENTS

| | | |
|---|---|---|
| 1,982,673 | Laursen | Dec. 4, 1934 |
| 2,203,072 | Albright | June 4, 1940 |
| 2,341,114 | Novak | Feb. 8, 1944 |
| 2,586,513 | Butler | Feb. 19, 1952 |
| 2,697,521 | Cherkin et al. | Dec. 21, 1954 |
| 2,709,279 | Raiche | May 31, 1955 |